May 11, 1965  F. T. STONE  3,182,950
VALVE FOR AN ATOMIZING SPRAY NOZZLE
Filed July 25, 1961  3 Sheets-Sheet 1

INVENTOR.
FRANZ T. STONE
BY
Jerome R. Cox
ATTORNEY

INVENTOR.
FRANZ T. STONE III
BY Jerome R. Cox
ATTORNEY

May 11, 1965   F. T. STONE   3,182,950
VALVE FOR AN ATOMIZING SPRAY NOZZLE
Filed July 25, 1961   3 Sheets-Sheet 3

INVENTOR.
FRANZ T. STONE III
BY
Jerome R. Cox
ATTORNEY

United States Patent Office 3,182,950
Patented May 11, 1965

3,182,950
VALVE FOR AN ATOMIZING SPRAY NOZZLE
Franz T. Stone, 351 Northview Drive,
Columbus, Ohio
Filed July 25, 1961, Ser. No. 126,696
12 Claims. (Cl. 251—63)

The invention disclosed and claimed in this application relates to valves for spray nozzles. In illustration of the invention, this specification discloses an adjustable automatic non-drip atomizing spray nozzle.

One of the objects of my invention is the provision of a valve for a spray nozzle which utilizes air for two purposes (i.e. (1) for controlling the opening and the closing of the nozzle and (2) for atomizing the liquid which is sprayed through the nozzle).

A further object of my invention is the provision of a poppet valve utilizing hydraulic liquid pressure to hold the valve closed (i.e., the pressure of the liquid being sprayed or atomized holds the valve tightly closed against leakage when in its closed or inoperative position).

A further more specific object of my invention is the provision of a relatively large piston operated by air pressure to control the opening and closing of the valve, eliminating the use of diaphragms which are uncertain in controlling valves of this nature.

A further object of my invention is the provision of means for metering the output by controlling the length of travel of the piston and poppet valve.

Further objects and features of my invention will be apparent from the following specification and claims when considered in connection with the drawings illustrating an embodiment of my invention.

Figures 1, 2:
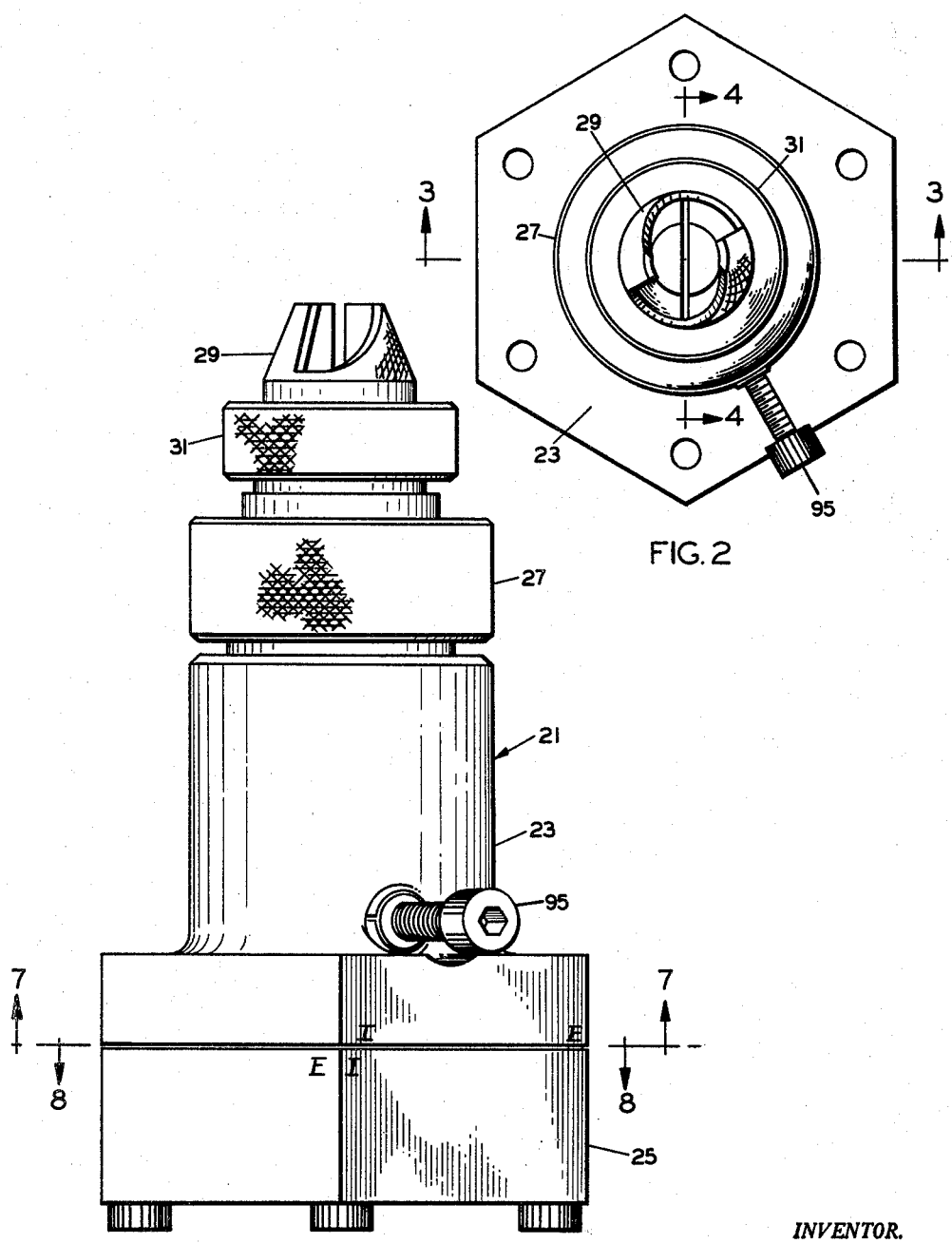
FIG. 1 is a view in elevation of an atomizing spray nozzle and valve embodying my invention looking at the valve directly at the intersection of the sides of the manifold marked E and I.
FIG. 2 is a top plan view of the nozzle shown in FIG. 1 on a slightly smaller scale.
Figure 3:
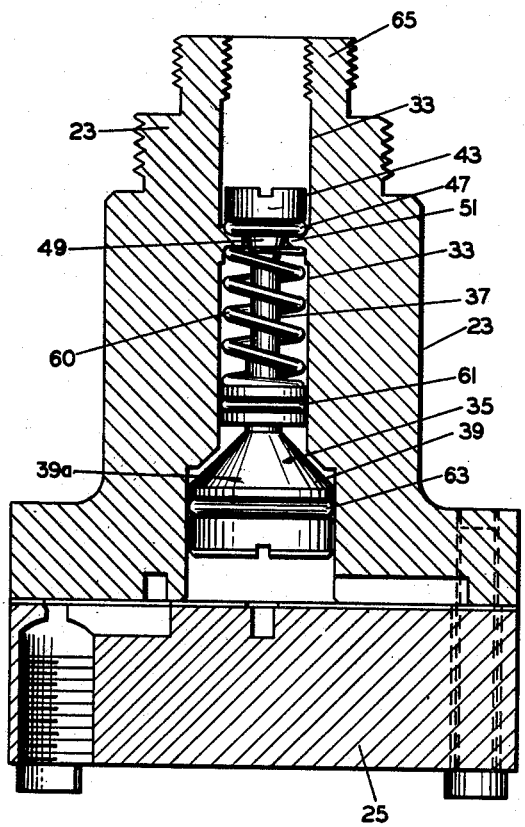
FIG. 3 is a view in vertical section of the main body of the valve and the inlet manifold, the fan adjusting outlet cap being removed for clarity and the section being taken on the line 3—3 of FIG. 2 and being on a slightly larger scale than that of FIG. 2.
Figure 4:
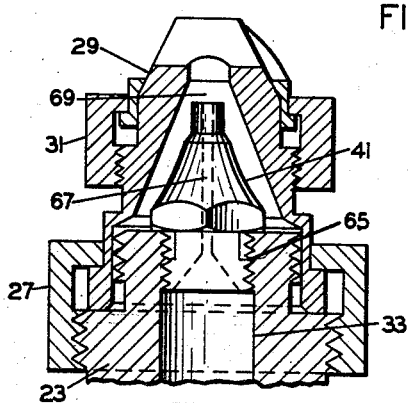
FIG. 4 is a view in vertical section of the outlet or, as viewed in the drawings, the upper portion of the valve taken substantially on line 4—4 of FIG. 2 and being on substantially the same scale as that of FIG. 1 and FIG. 3.
Figure 5:
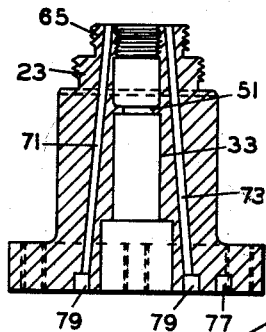
FIG. 5 is a view in vertical section on a smaller scale showing the main body of the valve and taken substantially on line 5—5 of FIG. 7.
Figure 6:
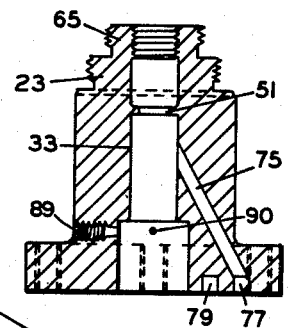
FIG. 6 is a view in vertical section on a scale similar to that of FIG. 5 showing the main body of the valve and taken substantially on the line 6—6 of FIG. 7.
Figure 11:
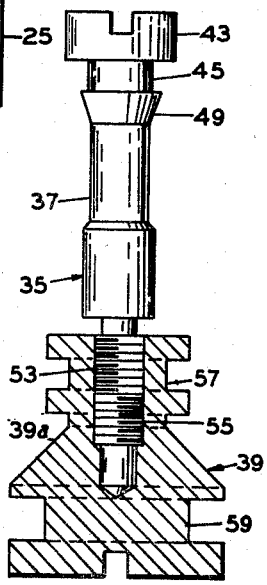
FIG. 11 is a view in elevation on an enlarged scale of the poppet valve member of FIG. 3 shown with the piston end thereof or lower part, thereof in section.
Figures 13, 14:
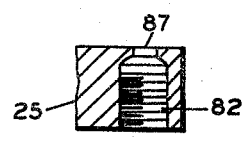
FIG. 13 is a sectional view of another detail of the manifold.
FIG. 14 is a sectional view of a still different detail of the manifold.
Figure 12:
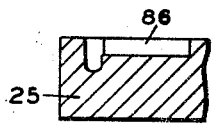
FIG. 12 is a sectional view of a detail of the manifold.

Referring still to the drawings for a detailed description of the invention, it may be seen that I have shown in FIG. 1 a nozzle and valve unit generally designated 21. This comprises a body 23, a manifold 25, an air nozzle lock ring 27, a fan adjusting cap 29, and a fan adjusting cap lock ring 31. The body 23 is formed with a main central internal stepped bore 33 as shown in FIGS. 3, 4, 5, 6 and 7. This bore forms a liquid supply chamber or cavity. Within this bore is positioned a poppet valve 35 (see FIGS. 3 and 11) consisting of an upper part or a valve head 43, a valve stem 37 and a lower part or piston portion consisting of a double piston 39 threaded onto the lower end of said valve stem. Screwed into the upper part or outlet end of the bore 33 (see FIG. 4) above the valve 35 is a liquid orifice member 41. The upper portion of the poppet valve 35 is formed with an enlarged head 43 with a groove 45 in which there is positioned a sealing ring 47. Adjacent the groove 45 the head 43 has a tapered surface 49. The tapered surface 49 cooperates with a constriction which provides an upper shoulder forming a valve seat 51, and when the valve moves downward the tapered surface 49 guides and centers the sealing ring 47 into sealing position on the valve seat formed by the outer surface of the shoulder or constriction 51 to prevent the escape of liquid except when the valve is open. The lower end of the valve stem 37 is threaded as at 53 to secure it to the lower portion or piston head 39, it being threaded into an internally threaded bore 55 in said piston head 39. The piston portion 39 is double-ended. The inner or upper end of the piston 39 has a sealing ring 61 and is appreciably smaller in diameter than the larger outer end of the piston portion 39 which carries a sealing ring 63. The effective area of the inner, smaller end of the double piston 39 is appreciably larger than the effective area of the inner surface of the valve head 43 which is subjected to the pressure of the liquid in the liquid chamber. The double piston head 39 is also formed with grooves 57 and 59 for the receipt of sealing rings 61 and 63, which are preferably O rings. A spring 60 is interposed between the piston head 39 and the valve seat 51. This spring normally tends to quickly close and to hold the poppet valve 35 in its closed position with the sealing ring 47 tight against the constriction or sealing seat 51. The liquid chamber portion of the bore 33 is that portion of the bore which lies between the constriction 51 and the sealing ring 61 on the piston 39.

The pressure of liquid in the liquid chamber portion of the bore 33 acts on the inner or upper end of the double piston head 39 to hold the sealing ring 47 of the head 43 tight against its seat and prevent leakage. The pressure of the liquid in the liquid chamber portion of the bore 33 holds the valve sealing ring 47 against the outer surface of the shoulder or constriction 51 which forms the valve seat, with a force which varies directly with the pressure of the liquid. This action provides an automatic adjustment of the pressure or tightness of the valve against the valve seat with changes in the pressure of the liquid. It will be understood that the closing force exerted by the liquid varies directly with the pressure of the liquid in the chamber, whereas the spring exerts a substantially constant force regardless of the pressure of the liquid in the chamber.

The liquid orifice member 41 (see FIG. 4) is formed with a lower externally threaded neck 65 by which it is secured within the internally upper threaded portion of body 23. It is also provided with a central bore 67 through which liquid under pressure is delivered from the liquid chamber portion of the bore 33 to a space 69 in the fan type air nozzle 29. The main body 23 is provided with passageways 71 and 73 (FIG. 5) through which fluid such as compressed air is delivered from the manifold 25 to the space 69 (see FIG. 4). Hereinafter where air is referred to as a preferred fluid, it is to be understood that we may use any other appropriate fluid. The space 69 forms a spraying cavity. There the air picks up the liquid delivered to said space 69 through the orifice or bore 67, and atomizes it and sends it out in a spray from the nozzle 29.

The main body 23 is also provided with a passageway 75 (see FIG. 6) through which liquid is delivered from the manifold 25 to the bore 33. The pressure of liquid in the liquid chamber portion of the bore 33 coming thereto from the passageway 75 and acting on the inside face of the double piston 39 aids in holding the poppet valve 35 tightly against the sealing seat 51. When air under high pressure is supplied to the outside face of the piston head 39, it lifts the poppet valve 35 so that the sealing ring 47 is lifted above the sealing seat 51 and liquid may pass under pressure from the bore 33 into the space 69. In operation, the air pressure moves the piston head 39 inward which forces the poppet valve away from the seat and thus simply controls the operation through a one-moving-part piston and valve assembly. Air under pressure coming into the space 69 through the bores 71 and 73 atomizes this liquid which may be oil and sprays it out through the fan adjusting cap 29 as for example to a part to be lubricated. The cap 29 is shown on the drawings as being a fan adjusting cap, but it will be obvious that any type of cap or outlet nozzle may be used.

Figures 7, 9:
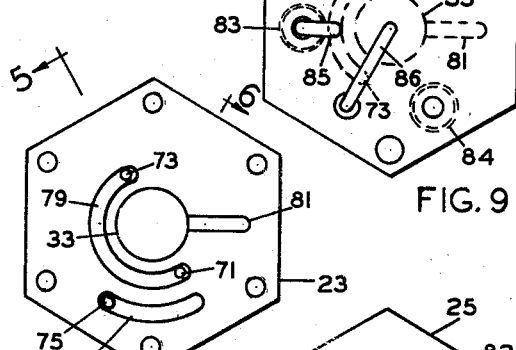
FIG. 7 is a bottom plan view of the main body unit taken on the line 7—7 of FIG. 1 and looking upward.
FIG. 9 is an imaginary plan view showing the manifold as in FIG. 8 with the porting of the main body superimposed in dotted lines with the main body unit turned back over about its horizontal axis to the position of FIG. 1 so that the correspondence between the porting of FIG. 7 with the porting of FIG. 8 may be more easily followed.

The manifold 25 controls the delivery of air and liquid to the body 23. As shown in FIG. 7, the bottom face of the lower part of the body 23 is provided with an arcual groove 77 which is connected to the liquid bore 75. It is adapted to be connected by the manifold 25 with a source of liquid under pressure. The bottom face of the lower part of the body 23 is also provided with a 180° arcual groove 79 which is connected to the passageways 71 and 73. The groove 79 is adapted to be connected by the manifold 25 with a source of air under pressure. Depending upon the position of this manifold 25, this atomizing air may be from the same source of air under pressure as the air which is connected to the central bore of the body 23. In such case, the air which acts upon the piston 39 of the poppet valve 35 is under the same pressure as the spraying or atomizing air. The atomizing air may on the other hand be from a separate source of air if it is desired to arrange it so that lower or higher pressure air may be used to atomize or spray the liquid than that which is used for controlling the poppet valve 35. The bottom face of the lower side of the body 23 is also provided with a radial groove 81 which connects with the enlarged lower end of the central bore 33 of the body 23. It supplies air to the central bore 33, this air acting upon the larger or outer end of the piston 39 of the poppet valve 35. The air which is supplied through the groove 81 to the bore 33 comes from the manifold 25 and may be either from the same source of air which is supplied through the groove 79 to the bores 71 and 73 or may be from a separate source of air. The piston head 39 is tapered as shown at 39a. The taper 39a forms a smaller diameter portion of the piston portion 39 and thus provides a chamber or cavity between the sealing rings 61 and 63. This chamber is provided with an air vent 90 (FIG. 6) which serves to maintain atmospheric pressure in this chamber or cavity portion of the bore 33. The air vent 90 permits air in this space or any liquid or actuating fluid which may pass the sealing rings 61 or 63, respectively, to be readily discharged to the atmosphere. An adjustable limit screw 95 contacts this taper and limits the inward movement of the piston head 39. Thus the movement of the valve head 43 from its seat is also limited and the amount of liquid passing the constriction 51 can be adjustably controlled. The quantity of liquid supplied is thus controlled by the adjustable set screw 95 which limits the travel of the poppet valve. A tapped hole 89 (FIG. 6) is provided in the valve body 23 for the limit screw 95.

*Operation*

It may be seen by a comparison of FIGS. 7, 8, 9 and 10 that the manifold 25 cooperates with air grooves 79 and 81 and the liquid groove 77 on the underside of the body 23 to supply air and liquid through the body 23 for the purposes desired. The liquid inlet 82 is (in the position of the parts shown in FIG. 9) connected by an outlet hole 87 to the groove 77. The air inlet 83 is (in the position shown in FIG. 9) connected to the grooves 85 and 79, and the pilot inlet 84 is (in the position shown in FIG. 9) blanked off so that it is not connected to any grooves of the bottom face of the body 23 or of the manifold 25. In such position the air inlet 83 is connected by the groove 85 to the groove 79, and the groove 79 is connected to the enlarged end of the bore 33 by the groove 86. Thus air from inlet 83 is delivered both to passageways or bores 71 and 73 and to the enlarged end of the central bore 33. The liquid inlet 82 is in such position connected through the groove 77 to the liquid or oil passageway 75.

Figures 8, 10:
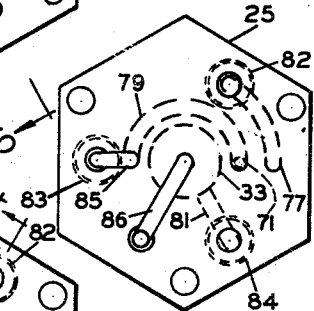
FIG. 8 is a top plan view of the manifold taken substantially on line 8—8 of FIG. 1 and looking downward.
FIG. 10 is an imaginary plan view similar to FIG. 9 but with the dotted line porting of the main body unit turned 60° clockwise therefrom to illustrate a different operational method.

If the manifold 25 is turned 60° to the relative position indicated in FIG. 10 (there the body is indicated turned 60° from the position of FIG. 9), the pilot inlet 84 is connected through the groove 81 to the bore 33. In this position of the parts, the air inlet 83 is still connected through the groove 85 with the groove 79 and the bores 71 and 73. Also, in this position the liquid inlet 82 is still connected through groove 77 with the bore 75. With the manifold in this position, the control of the valve 35 is by means of air from pilot inlet 84, and the atomizing air is supplied by air inlet 83. Liquid is supplied in all cases from liquid inlet 82.

Liquid which may be oil under pressure is supplied at all times to the inlet 82. With the parts in the position shown in FIG. 2 and FIG. 9, the supply of air to inlet 83 is controlled by a control valve. Opening of the control valve supplies air to the inlet 83, thence through grooves 85, 79 and 86 to the enlarged outer end of the bore 33. From groove 79 air flows also through passageways 71 and 73. Air under pressure in the enlarged end of the bore 33 acts on the outer end of piston 39 of the poppet valve 35 and raises the poppet valve 35 and thus raises ring 47 from the valve seat 51, allowing liquid under pressure to flow into space 69. Air under pressure from bores 71 and 73 picks up the liquid in the space 69 and forces it out as a spray from the fan adjusting cap 29.

If the parts are adjusted as shown in FIG. 10, the operation is the same except that inlets 83 and 84 are both controlled by air control valves. The piston 39 is controlled by air from inlet 84, and only air for the spray is supplied through inlet 83.

It is to be understood that the above described embodiments of my invention are for the purpose of illustration only, and various changes may be made therein without departing from the spirit and scope of the invention.

I claim:
1. A valve for a spray nozzle comprising
   (a) a main body having a stepped bore,
      (1) said bore having a continually open outlet chamber at one end,

(2) said bore having a constriction forming a valve seat of reduced diameter at the inner end of said outlet chamber and concentric enlarged diameter portions on each side of said constriction,
(b) a valve element in said stepped bore
    (1) having a valve head at one end which is larger in diameter than said reduced diameter of said bore at said constriction,
    (2) said valve head being positioned on the outlet side of said constriction and adapted to seat on the outer surface of said constriction,
(c) said valve element having a piston at its opposite end making a substantially pressure-tight sliding fit in said bore, and
(d) also having an intermediate valve stem of relatively small diameter extending through said constriction and connecting said valve head and said piston,
(e) the intermediate portion of said bore between said valve head and the inner end of said piston forming when said valve is closed a pressure-tight liquid chamber for the liquid under pressure which is to be sprayed,
(e)(1) said constriction forming a passage for liquid from said liquid chamber to said outlet chamber when said valve is in its open position,
(e)(2) a liquid orifice having a continually open outlet hole between said outlet chamber and the outside of said valve body, said outlet chamber and said orifice being open to atmospheric pressure at all times when said valve is closed and forming a passageway for said liquid when said valve is open,
(f) means for supplying liquid to said liquid chamber, said liquid acting on said inner end of said piston to tend at all times to move said valve head in a direction toward its closed position against said outer surface of said constriction,
(g) the relative effective areas of the inner end of said piston and of the inner end of said valve head which are exposed to the pressure of the liquid in said liquid chamber being such that the force exerted by said liquid on said inner end of said piston appreciably exceeds the force exerted by said liquid on the inner end of said valve head, and
(h) means for intermittently and alternately for any desired intervals, first connecting the outer end of said piston to a supply of compressed air to open said valve and then cutting off said supply of compressed air to permit said valve to be moved rapidly to its closed position under the force acting continuously on said inner end of said piston.

2. A valve for a spray nozzle comprising
(a) a body portion having a bore extending through said body portion,
(b) said bore having coaxially extending portions comprising
    (1) a continually open outlet chamber at the outlet end of said body portion,
    (2) an inwardly extending shoulder having a bore of reduced diameter at the inner end of said outlet chamber,
    (3) said shoulder being adapted to form a valve seat facing outwardly toward said outlet chamber,
    (4) a liquid chamber portion for the liquid to be sprayed extending from said shoulder toward the opposite end of said bore, and
    (5) a portion of said bore at said opposite end having an appreciably larger diameter than the diameter of said liquid chamber portion,
(c) a poppet valve member in said bore adapted to be moved axially in said bore toward said outlet chamber to open the valve and to be moved toward said opposite end to close the valve,
    (1) said poppet valve member having a valve head adapted to make tight sealing engagement with said valve seat,
(d) an intermediate valve stem of relatively small diameter in said liquid chamber, and
(e) a double-ended piston portion at the end of said valve stem opposite said valve head,
    (1) the outer end of said piston portion making a snug sliding fit in said larger diameter opposite end of said bore,
    (2) the inner end of said piston portion making a snug sliding fit in said liquid chamber,
(f) a passageway in said body for supplying liquid under pressure to said liquid chamber,
(g) the area of said inner end of said piston being such that the pressure of the liquid in said liquid chamber will exert at all times a force on said inner end tending to move said poppet valve member to its closed position, and
(h) means for intermittently supplying gaseous fluid under sufficient pressure to the larger diameter end of said bore to act on said outer end of said piston to move said poppet valve to its open position, and for cutting off said supply of gaseous fluid when it is desired to close said valve.

3. The structure of claim 1 in which there is
(a) a spring in said liquid chamber adapted to exert a force on said valve element in the direction which tends to close said valve when said valve is open.

4. The structure of claim 1 in which
(a) said outer end of said piston is appreciably larger in diameter than said inner end of said piston and is adapted to make a substantially pressure-tight sliding fit in an enlarge diameter portion of said bore at the outer end of said opposite end of said bore.

5. The subject matter of claim 4 in which
(a) a spring is positioned in said liquid chamber and is adapted to exert a force on said poppet valve member in the direction which tends to move said valve member from its open position to its closed position.

6. The structure of claim 2 in which
(a) a spring is positioned in said liquid chamber and is adapted to exert a force on said poppet valve member in the direction which tends to move said valve member from its open position to its closed position.

7. A spray nozzle valve comprising:
a main body having a bore, said bore having a constriction forming a valve seat and dividing the bore into an outlet end and an inlet end, the outlet end comprising a spraying chamber which is provided with a continuously open outlet opening and the inlet end having a concentric portion comprising a liquid supply chamber, and a concentric enlargement comprising a control chamber;
a valve element in said bore having an intermediate stem of relatively small diameter, having a poppet valve head which is larger in diameter than said stem on one end, and having a double diameter piston head at its opposite end with a small diameter head which is larger than the diameter of said valve head and which fits snugly in liquid supply chamber portion of said bore and a large diameter head which fits in said control chamber, the poppet valve head being, when the valve is open, wholly in said spraying chamber and, when the valve is closed resting on the valve seat to seal the constriction against the passage of liquid therethrough, the small diameter piston head being positioned at all times in the liquid supply chamber, and the intermediate stem being wholly in said supply chamber when the valve is closed;
means for supply liquid under pressure to said liquid supply chamber in the bore in the main body between said poppet valve head and said piston head which liquid acts on the inner face of said piston head to draw said poppet valve head more firmly on the valve seat on said constriction; and means for intermittently supplying gaseous fluid under pressure to said control chamber to the outside face of said large diameter head to counteract the pressure of the liquid in said bore in order to move said valve head from the valve seat, and for removing the pressure of said fluid from said control chamber when it is desired to close said valve.

8. A spray nozzle valve comprising:
 (a) a body having a bore,
  (1) said bore having at one end an outlet chamber having a continuously open outlet passage between it and the atmosphere, and
  (2) said bore having a shoulder at the inner end of said outlet chamber forming a passage into said outlet chamber;
 (b) a valve element in said bore
  (1) having an intermediate valve stem of relatively small diameter and
  (2) having a valve head at one end of said valve stem which is larger in diameter than the diameter of said passage in said bore,
  (3) said valve head being positioned on the outlet chamber side of said shoulder;
 (c) the outwardly facing surface of said shoulder being adapted to form a valve seat for said valve head;
 (d) said valve element having a piston connected to the opposite end of said valve stem,
  (1) the outer end of said piston being appreciably larger in diameter than the inner end of said piston, and
  (2) said inner and said outer ends of said piston being adapted to make substantially pressure-tight sliding fits in portions of said bore of suitable diameters;
 (e) the portion of said bore between said shoulder and said piston being adapted to form a liquid chamber;
 (f) a passageway in said body for supplying liquid under pressure to said liquid chamber continuously during the use of said valve, said liquid acting on the inner end of said piston with a force tending to draw said valve head at all times into sealing engagement with said seat on the outlet chamber side of said shoulder;
 (g) the relative effective areas of the inner end of said piston and of the inner end of said valve head which are subjected to the pressure of said liquid being such that the force exerted by said liquid on the inner end of said piston appreciably exceeds the force exerted by said liquid on the inner end of said valve head; and
 (h) a fluid chamber at the opposite end of said bore, said chamber being adapted to be intermittently supplied with a high pressure gaseous fluid during intervals when it is desired to open said valve and to hold it open, the pressure of said gaseous fluid in said fluid chamber being sufficient to exert a force on said piston which will rapidly open said valve, said fluid chamber being adapted to be opened to the atmosphere when it is desired to close said valve.

9. A spray nozzle valve comprising:
 (a) a body having a bore,
  (1) said bore having at one end a continuously open outlet chamber, and
  (2) said bore having a shoulder at the inner end of said outlet chamber,
 (b) a valve element in said bore
  (1) having an intermediate valve stem of relatively small diameter and
  (2) having a valve head at one end of said valve stem which is larger in diameter than the diameter of the bore adjacent to said shoulder,
  (3) said valve head being positioned on the outlet chamber side of said shoulder,
 (c) the outwardly facing surface of said shoulder being adapted to form a valve seat for said valve head,
 (d) said valve element having a piston connected to the opposite end of said valve stem, said piston being adapted to make a substantially pressure-tight sliding fit in the opposite end of said bore,
 (e) the portion of said bore between said shoulder and said piston being adapted to form a liquid chamber,
 (f) a passageway in said body for supplying liquid under pressure to said liquid chamber, said liquid acting on the inner end of said piston with a force tending to draw said valve head at all times into sealing engagement with said seat on the outlet chamber side of said shoulder,
 (g) the relative effective areas of the inner end of said piston and of the inner end of said valve head which are subjected to the pressure of said liquid being such that the force exerted by said liquid on said inner end of said piston appreciably exceeds the force exerted by said liquid on the inner end of said valve head,
 (h) a manifold attached to said valve body at the opposite end of said bore, said manifold being adapted to close said opposite end of said bore to form a fluid chamber between said manifold and the outer end of said piston,
 (i) a liquid inlet in said manifold and a passageway in said manifold and in said body for conducting liquid from said manifold to said liquid chamber, and
 (j) a second inlet in said manifold and a second passageway in said manifold and said body for intermittently supplying gaseous fluid to said fluid chamber.

10. The spray nozzle valve of claim 2 in which there is
 (a) a vent to atmosphere from the portion of said bore which lies between said outer and said inner ends of said piston.

11. The spray nozzle valve of claim 8 in which there is
 (a) a chamber in said bore between said outer and said inner ends of said piston and an opening from said last-named chamber through said valve body to the atmosphere.

12. The spray nozzle valve of claim 7 in which there is
 (a) a chamber in said bore between said small diameter piston end and said large diameter piston end and an opening from said last-named chamber through said main body to the atmosphere.

References Cited by the Examiner

UNITED STATES PATENTS

| | | | |
|---|---|---|---|
| 1,209,182 | 12/16 | Lough et al. | 251—63 XR |
| 1,508,938 | 9/24 | Powers et al. | 251—285 XR |
| 2,260,987 | 10/41 | D'Archy et al. | 239—412 |
| 2,476,378 | 7/49 | Majneri | 251—62 |
| 2,492,873 | 12/49 | Lamb | 251—25 XR |
| 2,509,880 | 5/50 | Pelton | 251—63 XR |
| 2,564,896 | 8/51 | Gustafsson et al. | 239—412 |
| 2,589,794 | 3/52 | Frantz | 251—63 XR |
| 2,669,256 | 2/54 | Rampton | 251—62 XR |
| 2,730,269 | 1/56 | Earle et al. | 137—505.18 |
| 2,811,958 | 11/57 | Roush | 251—62 XR |
| 2,928,646 | 3/60 | Ashbrook | 251—63 |
| 2,929,605 | 3/60 | Wolf | 251—63 |

ISADOR WEIL, *Primary Examiner.*
ROBERT A. O'LEARY, MARTIN P. SCHWADRON, WILLIAM F. O'DEA, *Examiners.*